Patented Nov. 9, 1943

2,333,656

UNITED STATES PATENT OFFICE 2,333,656

ANTIOXIDANT FOR FATS AND OILS

Henry A. Mattill and Calvin Golumbic, Iowa City, Iowa, assignors to Lever Brothers Company, Cambridge, Mass., a corporation of Maine No Drawing. Application March 31, 1942, Serial No. 437,031

17 Claims. (Cl. 99—163)

This invention relates to methods and materials for preserving oils, fats, and food products containing the same by retarding oxidation and the development of rancidity therein, as well as to the oils, fats, and food products preserved by such methods and materials.

It is an object of the invention to provide a practical method for preserving food substances and particularly oils and fats, by the addition thereto of a small amount of at least two materials which act together to prevent or postpone injurious oxidation and rancidity changes.

It is a further object of this invention to employ small amounts of two or more materials which, when used together, exert a synergistic antioxidant action. That is, the antioxygenic effect obtained by the two or more materials is much greater than the sum of the antioxygenic effects, if any, of the several materials when used separately.

An additional object of the invention is to accomplish this stabilizing action of oils and fats without the use of harmful chemicals or adulterants, but rather by means of ingredients which in themselves are desirable from the nutritional standpoint.

It is well known that oils and fats often become rancid, which in the case of edible products, renders them unfit for human consumption. This is particularly true in the case of oils and fats that have been subject to refining or processing operations, or which are stored for an appreciable time before they are used. It is desirable to prevent those changes which result in rancidity, or at least to postpone them to such an extent that the oils and fats may be utilized before any undesirable action takes place.

Some of the constituents of oils and fats are well known in chemistry to possess a tendency to absorb and react with oxygen. The development of rancidity results primarily from the products formed during oxidation. The dissolved or absorbed oxygen usually reacts first to form peroxides. The development of the peroxides may be accelerated by moisture, heat, light or catalysts. Aldehydes, ketones and acids of lower molecular weight may be formed among others in the further decomposition and these materials impart an undesirable odor and taste to the oil or fat.

The fats and oils to which the invention is applicable comprise the glycerides of fatty acids. These may be obtained from the naturally occurring sources, such as animal or vegetable oils and fats or from synthetic sources. Lard, in particular, is an example of a fat from an animal source that has a tendency to turn rancid and is, therefore, improved as to keeping qualities by the addition of an antioxidant. Vegetable oils, such as cottonseed oil, coconut oil, palm oil, sesame oil, soyabean oil, peanut oil, sunflowerseed oil, etc. are examples of vegetable oils to which an antioxidant may be added. Shortenings of the dry plastic type composed of partially hydrogenated oils may also be protected by antioxidants as well as similar shortenings produced by compounding an oil with a hard fat.

The efficiency of an antioxidant may be expressed in terms of the resistance of an oil or fat to the absorption of oxygen. When an oxidizable oil or fat is exposed to air under standardized conditions, a definite time interval elapses before there is any appreciable absorption of oxygen by the oil or fat. This interval is termed the "induction period." It is possible, therefore, to denote the action of an antioxidant in terms of its ability to prolong the induction period. This method has been standardized and can be carried out conveniently by a comparison of the stabilized oil or fat with a control, i. e., an oil or fat not containing an antioxidant but which has been otherwise treated under like conditions. Such a test may be employed in evaluating the antioxidants referred to more particularly hereinafter and will be referred to in denoting the extent of their antioxidant action.

In expressing the antioxygenic activity of an antioxidant, the oxygen absorption method may readily be used in the case of lard, but this method can not be applied so satisfactorily in the case of vegetable oils. Lard demonstrates a definite induction period after which the absorption of oxygen is rapid.

Vegetable oils absorb oxygen more slowly and the end of the induction period is not sharply defined. Furthermore, the oxygen absorption method is time-consuming when applied to vegetable oils unless high temperatures are used. Inasmuch as a temperature of 70–80° C. has proved to be a convenient temperature at which to measure oxygen absorption, a method was developed for reducing the induction period of these oils to a convenient interval, while at the same time retaining the properties of the oils with regard to their effect by antioxidants.

The most satisfactory method proved to be the use of methyl or ethyl esters of the fatty acids of the oil or fat. As illustrative of their preparation, two parts of absolute alcohol containing 2% to 3% of hydrogen chloride is added to one part of the oil or fat, and the mixture is refluxed on a steam bath for 18 to 24 hours. The mixture is then cooled and diluted with water. The ester layer is washed repeatedly with water to remove the hydrochloric acid and alcohol, then centrifuged free from occluded water, and finally heated on a steam bath in a vacuum to remove any traces of solvents. The remaining liquid contains the ethyl esters of the fatty acids, the unsaponifiable constituents of the original oil or fat, and possibly traces of unhydrolyzed glycerides. The glycerol and any water-soluble constituents will have been removed.

The product so obtained from a partially hydrogenated cottonseed oil, for example, could be used to assay antioxidants by the oxygen absorption method since the product has a convenient induction period and a rapid rate of oxygen absorption at the end of the induction period. Furthermore, the protection offered to the product by various anti-oxidants was qualitatively parallel to that conferred upon the original fat. Lard can be similarly treated.

Other materials that can be used in determining the effectiveness of antioxidants include the fatty acids of oils and fats, and the distilled esters of oils and fats.

As has been mentioned heretofore, some of the products formed in the early stages of the oxidation of oils and fats are peroxides, and the extent of the oxidation of an oil or fat can be determined from its peroxide content. Thus the effectiveness of an antioxidant added to suppress or delay oxidation can be denoted in terms of the amount of peroxides formed or their absence. This method has been standardized and the peroxide number of an oil or fat containing an antioxidant, after being exposed to air under standardized conditions for a given time, can be used to evaluate the antioxidant action.

While in general it is preferred to indicate the antioxidant efficiency in terms of the induction period, for purposes of uniformity and ease of comparison, there may be certain instances where a designation in terms of peroxide value will be more advantageous or revealing. The peroxide method of determining and indicating antioxidant efficiency may also be employed in designating the results obtained in accordance with the invention, should this be desirable.

Some of the compounds which we use synergistically as antioxidants are also known as vitamins; others are closely related chemically. The synergistic antioxidant action of the compounds used is to be distinguished from their physiological action and the fact that they have a vitaminic action is more or less incidental insofar as the invention is concerned. The amounts employed also are so small that an oil or fat stabilized with the compounds used would not be a good source for any vitamins needed by the body. In addition certain of the compounds, very closely related chemically, function as synergistic antioxidants in accordance with the invention, but do not have the physiological effect of the vitamins. This confirms the suggestion that the vitaminic action of certain of the antioxidants used in accordance with the invention is without significance. It is a desirable feature of the invention, however, that the antioxidants used are vitamins or closely related compounds, because their use does not introduce a deleterious chemical into the oil or fat. This is important when the oil or fat is intended for human consumption.

We have discovered that the simultaneous inclusion in an oil or fat of a quinone or hydroquinone, as exemplified by the alkyl substituted 1,4-naphthoquinones or naphthohydroquinones, with an ascorbic acid; or with a chroman, chromen, coumarone, or coumaran, as exemplified by the tocopherols; or with both, results in a synergistic action by means of which a pronounced antioxidant effect is obtained. In other words, when the quinone and the ascorbic acid are employed together, or when the quinone and the chroman type compound are employed together, or when all three compounds are used together, the antioxygenic effect obtained by the use of these combined materials is appreciably more than the additive antioxygenic effects of the compounds, if any, when employed separately. We believe this to be unexpected from any consideration of the properties of the individual compounds. A more detailed definition of the several compounds used is set forth hereinafter.

Lard is a fat which does not naturally contain any of the antioxidants of the type herein described as useful in accordance with the invention, or at least not in a significant amount. For this reason lard is a more or less ideal substrate in which to test the effect of the antioxidants individually and to demonstrate the synergistic action of two or more of the antioxidants when used together in the manner described heretofore.

In considering the synergistic effect, it is necessary to keep in mind that certain naturally occurring fats and oils, particularly those from certain vegetable sources, contain a small amount of tocopherol as a natural ingredient. Thus when a quinone or quinol type compound is added to a fat naturally containing a tocopherol, the antioxidant effect is the result of the synergistic action of quinone or quinol type compounds and the tocopherol. Similarly, if both a quinone or quinol type compound and an ascorbic acid are added to an oil or fat naturally containing a tocopherol, the antioxidant effect will be the result of the synergistic action of all three materials, namely the tocopherol, the quinone or quinol type compound and the ascorbic acid. The same may be said for the methyl or ethyl esters of oils or fats naturally containing a tocopherol.

In the case of lard, and the methyl or ethyl esters thereof, which do not contain any tocopherol as a natural ingredient, it is necessary to add a tocopherol when a synergistic antioxidant effect is desired in which tocopherol is to play a part.

When tocopherol is to be utilized for its antioxidant effect in accordance with the invention, it is immaterial whether it is present as a naturally occurring ingredient or whether it is added; the invention contemplates either. In those instances where a tocopherol is naturally present, and in an amount sufficient for the purpose, it would not be necessary to add an additional quantity from an outside source in order to secure the synergistic effect in which it plays a role. In instances where a tocopherol is naturally present but not in a sufficient amount it may be supplemented.

As illustrative of the invention utilizing the quinone or quinol type compound and ascorbic acid, the following table shows the results obtained using lard as a material to which these two ingredients are added. Since the lard does not contain any tocopherol, the antioxidant effect is dependent only upon the action of the quinone or quinol type compound and the ascorbic acid.

*Table I*

| Substrate | Inhibitor used | Amount, percent | Induction period in hours | Increased length induction period, hours |
|---|---|---|---|---|
| Lard | None | | 11 | |
| | 1,4-naphthohydroquinone | 0.02 | 34 | 23 |
| | Ascorbic acid | 0.10 | 14 | 3 |
| | 1,4-naphthohydroquinone and ascorbic acid | 0.02 / 0.10 | ¹115+ | 104+ |
| | 2,5 dimethyl hydroquinone | 0.04 | 41 | 30 |
| | 2,5 dimethyl hydroquinone and ascorbic acid | 0.04 / 0.10 | 84 | 73 |
| Ethyl esters of lard | None | | 1 | |
| | 2-methyl-1-naphthol | 0.02 | 25.5 | 24.5 |
| | Ascorbic acid | 0.10 | 1 | 0 |
| | 2-methyl-1-naphthol and ascorbic acid | 0.02 / 0.10 | ¹144+ | 143+ |
| | 3-methyl-1-naphthol | 0.02 | 17.5 | 16.5 |
| | 3-methyl-1-naphthol and ascorbic acid | 0.02 / 0.10 | ¹144+ | 143+ |

¹ Fresh when discontinued.

In order to demonstrate the synergistic action obtained when a quinone or quinol type compound is used with a chroman type compound, tests were made with lard as the substrate, and the results are as follows:

*Table II*

| Substrate | Inhibitor used | Amount | Induction period in hours | Increased length of induction period, hours |
|---|---|---|---|---|
| Lard | None | | 16 | |
| | α-Tocopherol | 0.02 | 35.5 | 19.5 |
| | 1,4 naphthohydroquinone | 0.02 | 24 | 8 |
| | α-Tocopherol and 1,4 naphthohydroquinone | 0.02 / 0.20 | ¹110+ | 94+ |
| Do | α-Tocopherol | 0.02 | 30 | 14 |
| | 2-methyl-1,4 naphthohydroquinone | 0.10 | 20 | 4 |
| | α-Tocopherol and 2-methyl-1,4 naphthohydroquinone | 0.02 / 0.10 | ¹104+ | 88+ |
| Do | α-Tocopherol | 0.02 | 32 | 16 |
| | 2-methyl-3-hydroxy 1,4 naphthohydroquinone | 0.10 | 15½ | 0 |
| | α-Tocopherol and 2-methyl-3-hydroxy 1,4 naphthohydroquinone | 0.02 / 0.10 | ¹108++ | 90+ |
| Do | α-Tocopherol | 0.02 | 39 | 23 |
| | 2,5 dimethyl hydroquinone | 0.04 | 102 | 86 |
| Do | α-Tocopherol and 2,5 dimethyl hydroquinone | 0.02 / 0.04 | 194 | 178 |

¹ Fresh when discontinued.

*Table III*

| Substrate | Antioxidant | Induction period in hours | |
|---|---|---|---|
| | | With antioxidant | Control |
| Lard | 0.02% chroman-5,6-quinone | 191 | 11 |
| Do | 0.10% 2-methyl-1,4 naphthohydroquinone | 36 | 11 |
| Do | 0.02% chroman-5,6-quinone+0.10% 2-methyl-1,4 naphthohydroquinone | ¹312++ | 11 |

¹ Fresh when discontinued.

*Table IV*

| Substrate | Antioxidant | Induction period in hours | |
|---|---|---|---|
| | | With antioxidant | Control |
| Lard | 0.02% 1,4 naphthohydroquinone | 25 | 20½ |
| Do | 0.02% 1,4 naphthohydroquinone | 38½ | 21 |
| Do | 0.01% β-tocopherol | 50½ | 20½ |
| Do | 0.01% 5,7 dimethyl tocol | 62½ | 21 |
| Do | 0.02% 1,4 naphthohydroquinone+0.01% β-tocopherol | ¹160++ | 20½ |
| Do | 0.02% 1,4 naphthohydroquinone+0.01% 5,7 dimethyl tocol | 117 | 21 |

¹ Fresh when discontinued.

As illustrative of the invention utilizing both a quinone or quinol type compound with a chroman type compound when the latter is naturally contained in the oil, the following tests were made with the results indicated:

*Table V*

| Substrate | Antioxidant | Induction period in days |
|---|---|---|
| Hydrogenated vegetable oil | N. o. toc.¹ | 11 |
| Do | N. o. toc.+0.04% 1,4 naphthohydroquinone | 38 to 45 |
| Do | N. o. toc.+0.04% 2,5 dimethyl hydroquinone | 53 to 56 |

¹ Naturally occurring tocopherol (0.10% by analysis).

In the above instances the antioxidant action of the tocopherol must be less than 11 days induction period and the quinone alone would not account for the increase as is apparent from Table I where the quinones are used per se. The action must be due to synergism of the quinone and the tocopherol.

The synergistic action of all three ingredients is shown in the following table:

*Table VI*

| Substrate | Inhibitor used | Amount, per cent | Induction period, days | Increased length of induction period, days |
|---|---|---|---|---|
| Hydrogenated cottonseed oil | N. o. toc.² | | 13 | |
| | N. o. toc.+ascorbic acid | 0.02 | 29 | 16 |
| | N. o. toc.+2-methyl-1,4 naphthohydroquinone | 0.04 | 22 | 9 |
| | N. o. toc.+2-methyl-1,4 naphthohydroquinone+ascorbic acid | 0.04 / 0.02 | ¹46+ | 33 |
| | N. o. toc | | 11 | |
| | N. o. toc.+ascorbic acid | 0.02 | 19 | 8 |
| Do | N. o. toc.+1,4 naphthohydroquinone | 0.04 | 45 | 34 |
| | N. o. toc.+ascorbic acid+1,4 naphthohydroquinone | 0.02 / 0.04 | 90 | 79 |
| | N. o. toc.+2-methyl-1-naphthol | 0.01 | 15 | 4 |
| Do | N. o. toc.+2-methyl-1-naphthol+ascorbic acid | 0.01 / 0.02 | 42 | 31 |
| | N. o. toc.+2,5 dimethyl hydroquinone | 0.04 | 56 | 45 |
| Do | N. o. toc.+2,5 dimethyl hydroquinone+ascorbic acid | 0.04 / 0.02 | 94 | 83 |

¹ Fresh when discontinued.
² Naturally occurring tocopherol (0.10% by analysis).

The quinone type of compounds comprise the naphthols, quinones and quinols including the α-naphthols, such as 2-methyl-1-naphthol, 3- methyl-1-naphthol, the α-naphthoquinones, the α-naphthohydroquinones, the alkyl-substituted naphthohydroquinones, such as 2-methyl-1,4-naphthohydroquinone, the alkyl-substituted hydroquinones, such as 2,5-dimethylhydroquinone, the benzoquinones and corresponding quinols, such as the p-xyloquinones, the p-xylohydroquinones, the β-naphthoquinones, the lapachones, such as β-lapachone and dehydro-iso-β-lapachone.

The ascorbic acid may be used in the form of any of its isomers, and the 1-form is not essential but would probably be used commercially because of its availability.

The chroman type compounds comprise the class of chromans including the hydroxychromans, such as the 6-hydroxychromans, the α-β-γ-tocopherols, and the alkyltocols, such as 5,7-dimethyltocol, the chromens including the hydroxychromens, such as the 6-hydroxychromens and alkyl substituted compounds, the coumarans including the hydroxy-coumarans, such as the 5-hydroxycoumarans and alkyl substituted compounds, the isocoumarones including the hydroxycoumarones, such as the 5-hydroxycoumarones, the hydroxyisocoumaranones and aromatic and alkyl substituted compounds, such as the 5- and 7-hydroxyisocoumaranones, and the chroman-5,6-quinones and their precursors which are associated with vitamin E.

The amounts used are not particularly critical and relatively small amounts can be used; there is probably no minimum of any substantial amount which will not yield some result. The use of more than is necessary would not be economical. For commercial purposes it is probably desirable to have the compounds in the amount of from 0.005% to 0.1%.

The chemistry involved in the coaction of the compounds is not entirely understood, but certain observations indicate that the synergistic action may be attributed to the potentials of compounds. However, having fully disclosed our invention, and the manner in which it may be practiced, we do not wish to be limited to any theory of operation.

The chroman type compounds and the quinone type compounds, being oil-soluble, would normally dissolve in oil as distinguished from water. They could be used together in a dry oil or in an oil and water emulsion since in either case they would dissolve in the oil and act synergistically with the oil. The ascorbic acid, being very water-soluble, would normally dissolve in water as distinguished from oil. Therefore, in the instances where ascorbic acid is used in connection with the quinone type compound or with the quinone type and chroman type compounds, it is important to note that the oil must be dry so that all of the ingredients are in the oil. This is to be distinguished from oil and water emulsions in which the ascorbic acid is in the water phase and any oil-soluble compounds are in the oil phase.

It will be obvious that our invention contemplates numerous alternative and equivalent embodiments other than those specifically mentioned as illustrative, and all of the same are intended to be included within the invention as claimed hereinafter.

We claim:

1. A composition of matter comprising an oleaginous material in which is included a small amount of a compound selected from the group consisting of naphthols, quinones and quinols; a small amount of an ascorbic acid; and a small amount of a compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E, said combination producing a synergistic action of inhibiting oxidation and the development of rancidity in the oleaginous matter.

2. A composition of matter comprising an oleaginous material in which is included a small amount of a compound selected from the group consisting of naphthols, quinones, and quinols and a small amount of an ascorbic acid, said combination producing a synergistic action of inhibiting oxidation and the development of rancidity in the oleaginous matter.

3. A composition of matter comprising an oleaginous material in which is included a small amount of a compound selected from the group consisting of naphthols, quinones and quinols, and a small amount of a compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E, said combination producing a synergistic action of inhibiting oxidation and development of rancidity in the oleaginous matter.

4. A plastic, dry, edible shortening formed from hydrogenated vegetable oil, in which is included a small amount of a compound selected from the group consisting of naphthols, quinones, and quinols, a small amount of an ascorbic acid, and a small amount of a tocopherol, said combination producing a synergistic action of inhibiting oxidation and the development of rancidity in the shortening.

5. A composition of matter comprising a dry, plastic, edible shortening in which is included a small amount of a compound selected from the group consisting of naphthols, quinones, and quinols, and a small amount of an ascorbic acid, said combination producing a synergistic action of inhibiting oxidation and development of rancidity in said shortening.

6. A composition of matter comprising a dry, plastic, edible shortening in which is included a small amount of a compound selected from the group consisting of naphthols, quinones and quinols, and a small amount of a tocopherol, said combination producing a synergistic action of inhibiting oxidation and development of rancidity in said shortening.

7. A composition of matter comprising a dry, plastic, edible shortening in which is included a small amount of a 1,4-naphthohydroquinone, a small amount of an ascorbic acid and a small amount of a tocopherol, said combination producing a synergistic action of inhibiting oxidation and development of rancidity in said shortening.

8. A composition of matter comprising a dry, plastic, edible shortening in which is included a small amount of a 1,4-naphthohydroquinone and a small amount of an ascorbic acid, said combination producing a synergistic action of inhibiting oxidation and development of rancidity in said shortening.

9. A composition of matter comprising a dry, plastic, edible shortening in which is included a small amount of a 1,4-naphthohydroquinone and a small amount of a tocopherol, said combination producing a synergistic action of inhibiting oxidation and development of rancidity in said shortening.

10. A process of inhibiting oxidation and the development of rancidity in oleaginous matter, which comprises adding a small amount of a compound selected from the group consisting of naphthols, quinones and quinols; a small amount of an ascorbic acid; and a small amount of a compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E.

11. A process of inhibiting oxidation and the development of rancidity in oleaginous matter, which comprises adding a small amount of a compound selected from the group consisting of naphthols, quinones, and quinols and a small amount of an ascorbic acid.

12. A process of inhibiting oxidation and the development of rancidity in oleaginous matter, which comprises adding a small amount of a compound selected from the group consisting of naphthols, quinones and quinols, and a small amount of a compound selected from the group consisting of hydroxychromans, tocopherols, alkyltocols, hydroxycoumarans, hydroxycoumarones, hydroxyisocoumaranones and the chroman-5,6-quinones and their precursors which are related to vitamin E.

13. A process of inhibiting oxidation and the development of rancidity in oleaginous matter, which comprises adding a small amount of a compound selected from the group consisting of naphthols, quinones, and quinols; a small amount of an ascorbic acid and a small amount of a tocopherol.

14. A process of inhibiting oxidation and the development of rancidity in oleaginous matter, which comprises adding a small amount of a compound selected from the group consisting of naphthols, quinones, and quinols, and a small amount of a tocopherol.

15. A plastic, dry, edible shortening formed from hydrogenated vegetable oil, in which is included 0.005% to 0.1% of a compound selected from the group consisting of naphthols, quinones, and quinols, 0.005% to 0.1% of an ascorbic acid, and 0.005% to 0.1% of a tocopherol, said combination producing a synergistic action of inhibiting oxidation and the development of rancidity in the shortening.

16. A composition of matter comprising a dry, plastic, edible shortening in which is included 0.005% to 0.1% of a compound selected from the group consisting of naphthols, quinones, and quinols, and 0.005% to 0.1% of an ascorbic acid, said combination producing a synergistic action of inhibiting oxidation and development of rancidity in said shortening.

17. A composition of matter comprising a dry, plastic, edible shortening in which is included 0.005% to 0.1% of a compound selected from the group consisting of naphthols, quinones and quinols, and 0.005% to 0.1% of a tocopherol, said combination producing a synergistic action of inhibiting oxidation and development of rancidity in said shortening.

HENRY A. MATTILL.
CALVIN GOLUMBIC.